Jan. 24, 1961    H. S. JORDAN, JR    2,969,189
PARALLELOGRAM ACTUATED VARIABLE AREA NOZZLE
Filed Jan. 28, 1960
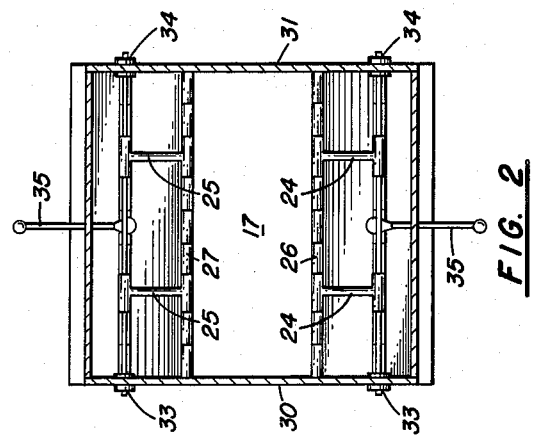
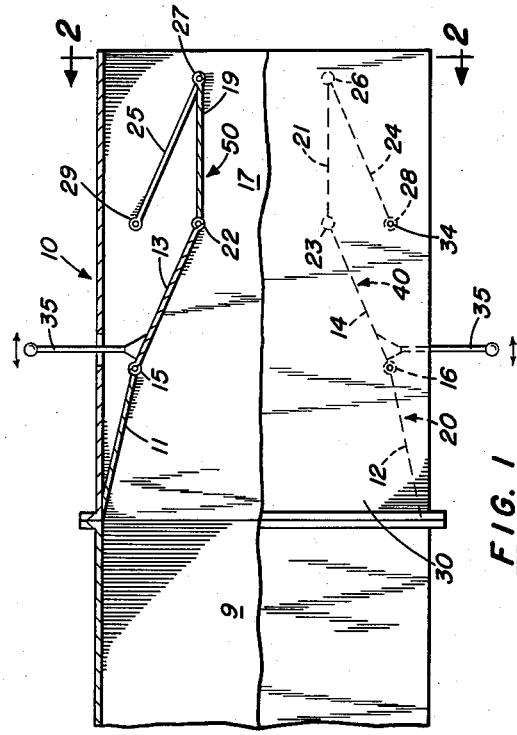
Inventor
HAROLD S. JORDAN, JR.
By R. S. Tompkins
Attorney

United States Patent Office 2,969,189
Patented Jan. 24, 1961

2,969,189

PARALLELOGRAM ACTUATED VARIABLE AREA NOZZLE

Harold S. Jordan, Jr., Kansas City, Mo., assignor, by mesne assignments, to the United States of America as represented by the Secretary of the Navy Filed Jan. 28, 1960, Ser. No. 5,313

6 Claims. (Cl. 239—455)

The present invention relates to an improved fluid conduit pressure control and more particularly to a variable area nozzle having a convergent and parallel segment. Such a nozzle arrangement provides flow characteristics similar to the favorable characteristics of a convergent-divergent nozzle.

The present invention provides a simple but effective means for varying the area of a nozzle having a convergent and parallel portion wherein pressure drop may be regulated across the nozzle. The portions are so related as to be easily and quickly adjusted to facilitate varying conditions in a fluid conduit. Such variable conditions are desirable in many different applications. For instance variable area nozzles are used to control the effective thrust in turbojet engines. Similarly such nozzles can control fluid flow in a water distribution system.

An object of the present invention is the provision of a variable area nozzle having a convergent and a parallel portion for obtaining close pressure drop control.

Another object of the present invention is to provide an easily and quickly adjusted variable area nozzle.

A further object of the present invention is the provision of a parallelogram construction in a variable area nozzle to facilitate changing its area.

Other objects and many of the attendant advantages of this invention will be readily appreciated as the same becomes better understood by reference to the following detailed description when considered in connection with the accompanying drawings wherein:

Fig. 1 shows a side elevation partly in section of a preferred embodiment of the invention; and Fig. 2 is an end view along line 2—2 of Fig. 1.

Referring now to the drawing wherein like reference characters designate like or corresponding parts throughout the several views, there is shown in Fig. 1 a fluid passageway 9. Attached to fluid passageway 9 is a variable area nozzle 10 having a fixed convergent portion 20 located in the upstream end of said nozzle formed by rectangular plates 11 and 12 disposed on opposite sides of the exhaust duct axis. A central movable convergent nozzle portion 40 is formed by rectangular plates 13 and 14 which are convergent with respect to each other and which are connected to the downstream ends of plates 11 and 12 by hinges 15 and 16 respectively. These segments along with side walls 30 and 31 as shown in Fig. 2 form a converging passageway having a variable area outlet 17.

A parallel nozzle portion 50 is formed by a pair of parallel rectangular plates 19 and 21 which are connected to the downstream ends of plates 13 and 14 by hinges 22 and 23 respectively. These plates along with side walls 30 and 31 form a passageway as shown in Fig. 2.

Plates 19 and 21 are connected to tie links 24 and 25 by hinges 26 and 27 respectively. Links 24 and 25 are connected to fixed supports 33 and 34 by hinges 28 and 29 to complete a simple but illustrative form of the invention wherein the nozzle tab method of construction is used to maintain a throat section always parallel to the fluid passageway center-line regardless of throat area.

Thus the operational advantages of a convergent-parallel walled nozzle arrangement are obtainable over a wide range of areas depending upon how the nozzle is pre-set.

The adjusting operation permits ease and quickness of change. Taking Fig. 1 to illustrate the adjustability of the device, it can be seen that a parallelogram type construction is present. Rectangular plates 13 and 14 are parallel to links 24 and 25 and plates 19 and 21 are parallel to the nozzle axis. A lever arm 35 is connected to each of the rectangular plates 13 and 14 which arm can be controlled by an electric actuator or a manual pinned position lock (not shown) and on rotation causes plates 13 and 14 to rotate about hinges 15 and 16 so as to vary the area of outlet 17. At the same time links 24 and 25 rotate about hinges 28 and 29 to a corresponding degree. Consequently, plates 19 and 21 are moved toward or away from the fluid passageway centerline but are nevertheless always parallel thereto.

The invention has been described in connection with a nozzle of rectangular cross-section to clearly show the inventive parallelogram means for varying a convergent-parallel walled type nozzle. This description is made merely for illustrative purposes it being obvious that the invention could be applied to nozzles comprised of a large number of tab segments which approximate a substantially circular cross-section.

It should therefore be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

Obviously many modifications and variations of the present invention are possible in the light of the above teachings. It is therefore to be understood that within the scope of the appended claims the invention may be practiced otherwise than as specifically described.

What is claimed is:

1. Fluid discharge nozzle apparatus comprising an upstream nozzle portion decreasing in cross-section in the downstream direction, a central variable area nozzle portion having movable sides converging with respect to each other, said sides being attached to the downstream end of said upstream nozzle portion, a downstream variable area nozzle portion having parallel sides attached to the downstream end of said central variable area nozzle portion and linkage means connected to said downstream variable area nozzle sides whereby as said nozzle portion with converging sides varies in area said nozzle portion with parallel sides varies in area.

2. Fluid discharge nozzle apparatus as recited in claim 1 wherein said linkage means comprises links hinged to the downstream end of the sides of the downstream nozzle portion, said links furthermore being pivotally connected to a fixed support means.

3. Fluid discharge nozzle apparatus as recited in claim 2 wherein said links are of the same length as the sides of said central variable area nozzle portion.

4. Fluid discharge nozzle apparatus comprising an upstream nozzle portion decreasing in cross-section in the downstream direction, movable plates hinged to said upstream nozzle portion, said plates being convergent with respect to each other, parallel plates hinged to the downstream end of said movable plates and wall means enclosing said movable plates and said parallel plates to form a flow passageway.

5. Fluid discharge nozzle apparatus as recited in claim 4 further comprising linkage means connected to said parallel plates whereby as said movable sides become more convergent with respect to each other said parallel plates move closer together.

6. Fluid discharge nozzle apparatus as recited in claim 5 wherein said linkage means comprises a link parallel to said movable plates, a fixed pivot point in which said link is mounted, said link being the same length as said movable plates so that said parallel plates are maintained parallel as they move closer together.

References Cited in the file of this patent
UNITED STATES PATENTS

| | | |
|---|---|---|
| 81,257 | Cushman | Aug. 18, 1868 |
| 2,936,580 | Lauzely et al. | May 17, 1960 |